Patented Apr. 9, 1929.

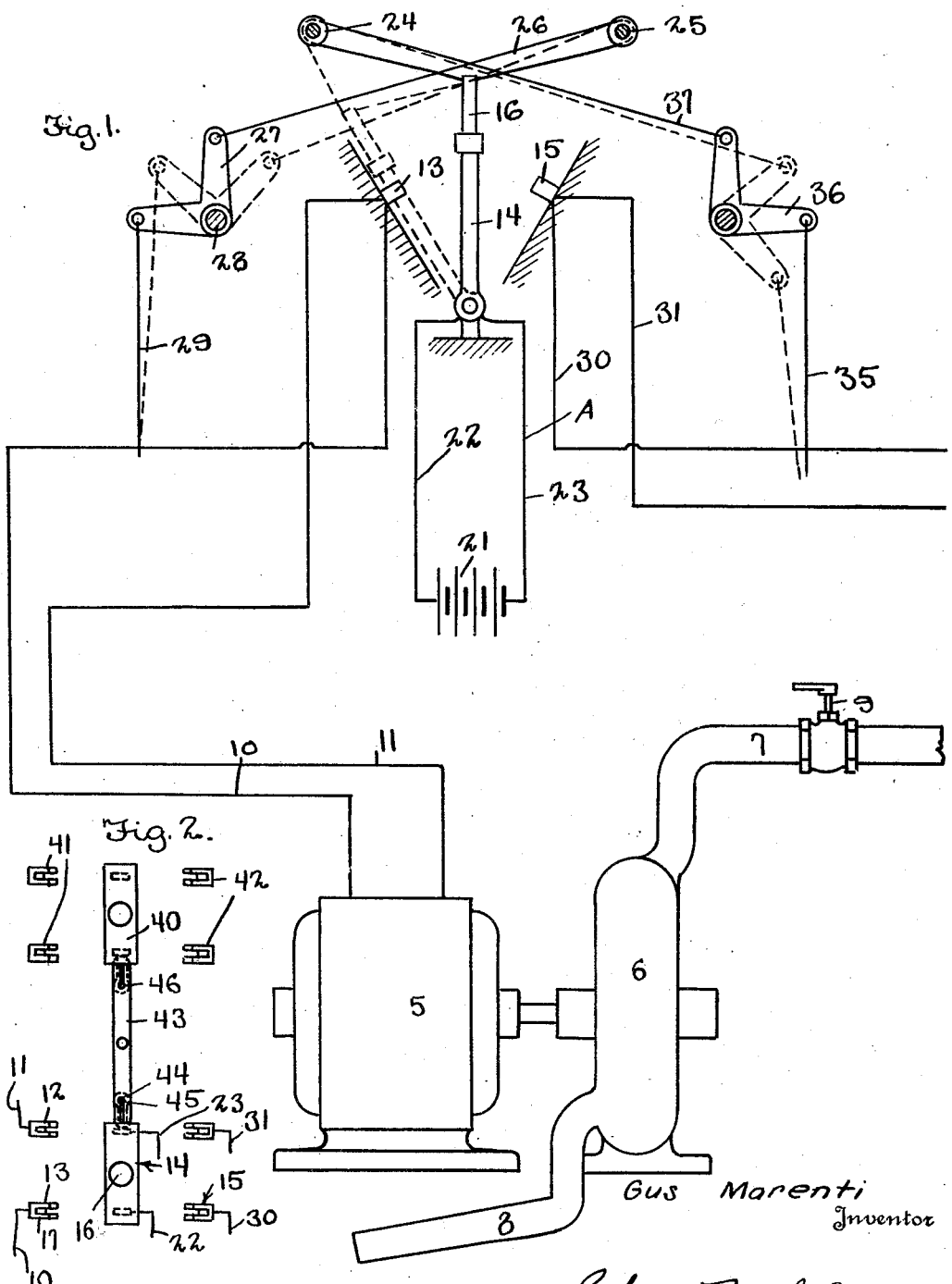

1,708,102

UNITED STATES PATENT OFFICE.

GUS MARENTI, OF DETROIT, MICHIGAN.

BATTERY-CHARGING SYSTEM.

Application filed September 3, 1926. Serial No. 133,471.

This invention relates to electrical systems and more particularly to battery charging systems.

An object of the present invention is to provide means for throwing a charged battery into an electric circuit for use and synchronously therewith a discharged battery out of the load circuit into a charging circuit, whereby one of the batteries will be charging while the other is being discharged.

A further object of the invention is the provision of novel means for connecting a pair of switches together, whereby upon the operation of one switch the other will be automatically operated therewith and in an opposite direction, whereby a battery controlled by one switch can be thrown into the charging circuit when discharged and the battery controlled by the other switch thrown into the load circuit.

With these and other objects in view the invention consists in the novel construction, arrangement and formation of parts, as will be hereinafter more specifically described, claimed, and illustrated in the accompanying drawings in which:

Figure 1 is a diagrammatic view showing the novel battery charging system, the control switch being shown in full lines in its neutral position and in dotted lines in battery charging position, and Figure 2 is a top plan view illustrating the novel means employed for operatively connecting a pair of control switches together, Referring to the drawings in detail, wherein similar reference characters designate corresponding parts throughout the several views the letter A generally indicates the improved system, which comprises an electric generator 5 which can be operated in any desired way such as by a water wheel 6. The water wheel 6 can be of any desired character and the same is provided with a water inlet 7 and a water outlet 8. The flow of water through the inlet 7 can be controlled by a valve 9 which can be automatically or manually operated as desired.

The generator 5 is provided with the lead and return wires 10 and 11. The wire 10 is electrically connected to one jaw 12 of a pair of jaws 13 arranged on one side of a double knife switch 14. On the other side of the double knife switch 14 is a pair of contact jaws 15. The switch is provided with any desired type of operating handle 16. The return wire 11 is electrically connected to the other jaw 17 of the pair of jaws 13. The battery to be charged is indicated by the reference character 21 and the terminals thereof have connected thereto electric conduit wires 22 and 23 which are electrically connected to the blades of the switch 14.

When the switch 14 is in engagement with the contact jaws 12 and 17 of the pair of jaws 13 the current will flow from the generator 5 to the wire 10 jaw 12, one blade of the switch, through the wire 23, battery 21, wire 22, through the other blade of the switch 14, jaw 17.

On each side of the knife switch 14 are pulleys 24 and 25. The pulley 25 has trained around the same stiff cable 26 one end of which is connected with one arm of a bell crank 27 which is rockably mounted at its angle as at 28. The opposite arm of the bell crank 27 has connected thereto a rod 29, which can constitute a hand pull.

When the battery becomes charged the bell crank 27 can be pulled downward by hand or other suitable means causing a pull on the cable 26, which has its end opposite to the bell crank 27 connected with the handle of the switch 14. This will pull the switch away from the pair of contact jaws 13 and move the same into engagement with the pair of contact jaws 15. Thus the circuit to the battery 21 is broken and further charge, at this time, is prevented. The battery can now be connected into the circuit for use and the pair of contact jaws 15 are arranged in this load circuit. This load circuit includes the lead wires 30 and 31 the inner terminals of which are connected to the pair of jaws 15. These wires are led to the desired place of use of the current. A pull rod 35 is connected with one arm of a bell crank 36. This bell crank 36 is rockably mounted at its angle on the opposite side of the switch 14 from the bell crank 27. One terminal of a stiff cable 37 is connected to the other arm of the bell crank 36 and this cable is trained over the pulley 24 and has its opposite end secured to the handle 16 of the throw switch 14.

When the battery 21 is in the load circuit, the switch 14 is in engagement with the pair of jaws 15, as heretobefore stated and the current will flow from the battery through the wire 22, one blade of the switch 14, one jaw of the pair of jaws 15 through the wire 30, back through the wire 31, through the other jaw of the pair of jaws 15, through the other blade of the switch 14, wire 23, back to the battery 21. As the battery becomes discharged, the bell crank 36 is pulled down by hand or other suitable means and the cable 37 will throw the switch 14 from out of engagement with the pair of jaws 15 into engagement with the pair of jaws 13. Consequently the battery will be thrown out of the load circuit into the charging circuit. Due to the connection of the cables 26 and 37 with the switch lever 14 movement of one bell crank will be transmitted to the other as is obvious.

The invention also comprehends the use of two storage batteries and these batteries are so arranged that when one is being charged the other will be in use and discharging. The charging of the battery and the discharging of the other battery is so balanced that the rate of charge and discharge will be equal, so that one battery will be ready to be recharged as the other is ready for use. To accomplish this I provide a second switch 40 which is arranged in longitudinal alinement with the switch 14 and this switch 40 is of the same construction as the switch 14 and is arranged in a charging circuit and discharging circuit. Thus on one side of the switch 40 is a pair of contact jaws 41 for the charging circuit and a pair of contact jaws 42 on the opposite side for the load circuit. Rockably mounted at a point equidistant its ends between the switches 14 and 40 is a double ended lever 43. The opposite terminals of the double ended lever 43 are provided with longitudinal slots 44 in which are slidably and pivotally mounted pins 45 and 46, which are carried respectively by the switch 14 and the switch 40. Thus when the switch 14 is moved into engagement with the pair of jaws 13 the switch 40 will be moved into engagement with the jaws 42. From this arrangement the battery controlled by the switch 14 will be connected with the charging circuit, while the battery controlled by the switch 40 will be connected with the load circuit. When the switch 14 is moved into engagement with the jaws 15 the switch 40 will be moved into engagement with the jaws 41 and thus the battery controlled by the switch 14 will be connected with the load circuit, while the battery controlled by the switch 40 will be in the charging circuit.

Changes in details may be made without departing from the spirit or scope of this invention, but:

What I claim as new is:

In an electric battery system, a switch including a throw handle having a pair of movable blades, a pair of contact jaws arranged on each side of the throw handle, a second switch including a rockable throw handle including a pair of blades, a pair of jaws arranged on opposite sides of the second mentioned switch, a double ended lever rockably mounted at a point intermediate its ends, and means operatively connecting the opposite ends of the double ended lever to the throw handles, whereby upon movement of one throw handle the other will be operated therewith and in a direction opposite thereto.

In testimony whereof I affix my signature.

GUS MARENTI.